(12) United States Patent
Houle et al.

(10) Patent No.: US 10,883,417 B2
(45) Date of Patent: Jan. 5, 2021

(54) COMBUSTION EXHAUST VALVE (71) Applicant: Speedwerx, Inc., Forest Lake, MN (US)

(72) Inventors: Steven Gary Houle, Forest Lake, MN (US); Jeremy Lee Houle, Ham Lake, MN (US)

(73) Assignee: SPEEDWERX, INC., Forest Lake, MN (US)

( * ) Notice: Subject to any disclaimer, the term of this patent is extended or adjusted under 35 U.S.C. 154(b) by 0 days.

(21) Appl. No.: 16/196,833

(22) Filed: Nov. 20, 2018

(65) Prior Publication Data

US 2019/0153933 A1   May 23, 2019

Related U.S. Application Data

(60) Provisional application No. 62/590,124, filed on Nov. 22, 2017.

(51) Int. Cl.
*F02B 37/22* (2006.01)
*F02B 37/02* (2006.01)
*F01N 1/16* (2006.01)

(52) U.S. Cl.
CPC .............. *F02B 37/22* (2013.01); *F02B 37/02* (2013.01); *F02B 2275/22* (2013.01)

(58) Field of Classification Search
CPC ...... F02B 37/22; F02B 37/02; F02B 2275/22; F01N 1/163; F01N 2290/04; F01N 2290/10; F01N 2260/06; F01N 3/0235
USPC .................. 60/602, 324; 137/513.3, 522, 527
See application file for complete search history.

(56) References Cited

U.S. PATENT DOCUMENTS

| | | | | |
|---|---|---|---|---|
| 1,483,354 A | * | 2/1924 | Kopper, Jr. | F01N 1/165 60/324 |
| 2,537,099 A | * | 1/1951 | Smith | F01N 13/085 137/527.8 |
| 2,637,264 A | * | 5/1953 | Harmon | F01N 13/085 137/527.8 |
| 2,852,037 A | * | 9/1958 | Downing | F16K 15/03 137/467 |
| 3,234,924 A | * | 2/1966 | May | F02D 9/04 60/324 |

(Continued)

FOREIGN PATENT DOCUMENTS

| | | | | |
|---|---|---|---|---|
| DE | 10219268 C1 | * | 7/2003 | F02D 9/04 |
| EP | 0147740 A2 | * | 7/1985 | F02D 9/02 |
| JP | 3029656 U | * | 10/1996 | F02D 9/10 |

*Primary Examiner* — Thai Ba Trieu
(74) *Attorney, Agent, or Firm* — Schwegman Lundberg & Woessner, P.A.

(57) ABSTRACT

This document discusses, among other things, a valve assembly for controlling an exhaust pressure of a gas combustion system. The valve assembly can include a valve housing, a flapper, and a biasing device. The valve housing can be coupleable to an exhaust pipe. The flapper can be pivotably coupleable to the valve housing to pivot between a full open position and a restricted position in response to exhaust pressure. The biasing device can be coupleable to the housing and extendable into the exhaust pipe to engage the flapper, where the biasing device can be configured to bias the flapper toward the restricted position and can be configured to resist movement of the flapper between the restricted position and the full open position.

16 Claims, 10 Drawing Sheets

(56) References Cited

U.S. PATENT DOCUMENTS

| | | | | |
|---|---|---|---|---|
| 3,523,418 | A * | 8/1970 | Marsee | F02D 9/04 60/324 |
| 3,779,511 | A * | 12/1973 | Wenglar | F16K 1/2265 251/308 |
| 4,075,990 | A * | 2/1978 | Ribeton | F02B 29/08 60/602 |
| 4,322,056 | A * | 3/1982 | Lew | F16K 1/225 251/306 |
| 4,699,244 | A * | 10/1987 | Bergquist | F01N 1/165 181/226 |
| 4,707,987 | A * | 11/1987 | Atkin | F02D 9/06 123/323 |
| 5,063,744 | A | 11/1991 | Ishiyama et al. | |
| 5,355,673 | A * | 10/1994 | Sterling | F01N 13/082 60/324 |
| 5,560,208 | A | 10/1996 | Halimi et al. | |
| 5,675,969 | A * | 10/1997 | Satoh | F02D 9/06 123/323 |
| 5,676,110 | A * | 10/1997 | Meneely | F02D 9/06 123/323 |
| 5,975,128 | A * | 11/1999 | Schatz | F02D 9/10 123/323 |
| 6,109,027 | A | 8/2000 | Schaefer | |
| 6,659,427 | B2 * | 12/2003 | Krimmer | F02D 9/10 251/306 |
| 8,156,730 | B2 * | 4/2012 | Guo | F02D 41/029 60/280 |
| 8,201,401 | B2 * | 6/2012 | Abram | F01N 1/166 60/324 |
| 2006/0272322 | A1 * | 12/2006 | Abram | F01N 1/165 60/324 |
| 2011/0000470 | A1 * | 1/2011 | Roth | F02D 13/0257 123/568.11 |
| 2013/0233269 | A1 * | 9/2013 | Houtschilt | F01N 1/163 123/188.1 |

* cited by examiner

COMBUSTION EXHAUST VALVE

PRIORITY CLAIM

This patent application claims the benefit of priority, under 35 U.S.C. Section § 119(e), to Steven Houle U.S. Provisional Patent Application Ser. No. 62/590,124, entitled COMBUSTION EXHAUST VALVE," filed on Nov. 22, 2017, which is hereby incorporated by reference herein in its entirety.

TECHNICAL FIELD

This document relates generally to combustion engines, and more particularly, but not by way of limitation, to systems, devices, and methods to a combustion exhaust valve for a high-performance engine, such as a snowmobile engine.

BACKGROUND

Various vehicles employ forced induction systems such as turbochargers and superchargers to increase horsepower and torque output and efficiency. These systems have variable power and torque curves. In a vehicle, such as a snowmobile, employing a forced induction system, vehicle performance varies based in part on where the engine is operating on its power and torque curve. Often, torque is high at low engine revolutions per minute (RPMs) and horsepower is high at high engine RPMs.

SUMMARY

This document discusses, among other things, systems and methods to vary the pressure or flow in an exhaust system by varying the effective size of an exhaust pipe using a valve. For example, a portion of the valve may be movable from an open position to a partially closed position. The effective size (e.g., cross-sectional area) of the exhaust pipe may be larger in the open position than in the closed position.

An example (e.g., "Example 1") of subject matter (e.g., a system) may include a valve assembly for controlling an exhaust pressure of a gas combustion system. The valve assembly can include a valve housing, a flapper, and a biasing device. The valve housing can be coupleable to an exhaust pipe. The flapper can be pivotably couplable to the valve housing to pivot between a full open position and a restricted position in response to exhaust pressure. The biasing device can be couplable to the housing and extendable into the exhaust pipe to engage the flapper, where the biasing device can be configured to bias the flapper toward the restricted position and can be configured to resist movement of the flapper between the restricted position and the full open position.

In Example 2, the subject matter of Example 1 optionally includes a plunger located within the housing, the plunger comprising: a proximal end engageable with the biasing device; and a distal end extendable into the exhaust pipe to engage the flapper.

In Example 3, the subject matter of any one or more of Examples 1-2 optionally include wherein the plunger is configured to reduce heat transfer to the biasing device.

In Example 4, the subject matter of any one or more of Examples 1-3 optionally include wherein the flapper comprises a shape complimentary to the exhaust pipe to minimize exhaust pressure drop over the flapper when the flapper is in the full open position.

In Example 5, the subject matter of any one or more of Examples 1-4 optionally include wherein a resistance of the biasing device is adjustable to match a power band of the gas combustion system.

In Example 6, the subject matter of any one or more of Examples 1-5 optionally include wherein the biasing device includes a damper, and the valve housing further comprises a damper receiver configured to house the damper therein, the damper receiver comprising a plurality of slots extending from an outer surface of the receiver to an inner surface of the receiver to reduce heat transfer to the damper.

In Example 7, the subject matter of any one or more of Examples 1-6 optionally include wherein the biasing device includes a spring.

In Example 8, the subject matter of any one or more of Examples 1-7 optionally include wherein the biasing device includes a servo motor.

In Example 9, the subject matter of Example 8 optionally includes wherein the servo motor is controlled based upon exhaust pressure or engine RPM.

In Example 10, the subject matter of any one or more of Examples 1-9 optionally include wherein the valve assembly is configured to control an inlet pressure to a turbine of the gas combustion system.

Example 11 is an internal combustion engine comprising: a gas combustion system; an exhaust pipe; and a valve assembly for controlling an inlet pressure to a turbine of the gas combustion system, the valve assembly comprising: a valve housing coupled to the exhaust pipe; a flapper pivotably coupled to the valve housing to pivot between a full open position and a restricted position in response to exhaust pressure; and a biasing device coupled to the housing and extending into the exhaust pipe to engage the flapper, the biasing configured to bias the flapper to the restricted position and to resist movement of the flapper between the restricted position and the full open position.

Example 12 is a snowmobile comprising: a drive system; a steering system; an internal combustion engine coupled to the drive system, the internal combustion engine comprising: a gas combustion system; an exhaust pipe; and a valve assembly configured to passively control an inlet pressure to a turbine of the gas combustion system to restrict the exhaust system to provide low-end torque and to open the exhaust system in response to exhaust system pressure to enhance top end horsepower.

Example 13 is a valve assembly kit configured couple to an exhaust system of a gas combustion system to restrict the exhaust system to provide low-end torque, and to open the exhaust system in response to exhaust system pressure to enhance top end horsepower.

In Example 14, the subject matter of Example 13 optionally includes wherein the valve assembly is configured to control an inlet pressure to a turbine of the gas combustion system.

In Example 15, the subject matter of any one or more of Examples 13-14 optionally include wherein the valve assembly kit includes a flapper contoured to match an inside of the exhaust pipe and a biasing device configured to bias the flapper to a restricted position, the biasing device configured to retract allow movement of the flapper to an open position in response to pressure in the exhaust system.

Example 16 is a valve assembly for controlling an exhaust pressure of a gas combustion system, the valve assembly comprising: a valve housing coupleable to an exhaust pipe;

a flapper pivotably couplable to the valve housing to pivot between a full open position and a restricted position in response to exhaust pressure; and a biasing device couplable to the housing and extendable into the exhaust pipe to engage the flapper, the biasing device configured to bias the flapper toward the restricted position and to resist movement of the flapper between the restricted position and the full open position.

In Example 17, the subject matter of Example 16 optionally includes a plunger located within the housing, the plunger comprising: a proximal end engageable with the biasing device; and a distal end extendable into the exhaust pipe to engage the flapper.

In Example 18, the subject matter of Example 17 optionally includes wherein the plunger is separated from the biasing device to reduce heat transfer to the biasing device.

In Example 19, the subject matter of any one or more of Examples 16-18 optionally include wherein the flapper comprises a shape complimentary to the exhaust pipe to reduce exhaust pressure drop over the flapper when the flapper is in the full open position.

In Example 20, the subject matter of any one or more of Examples 16-19 optionally include wherein a resistance of the biasing device is adjustable to match a power band of the gas combustion system.

In Example 21, the subject matter of any one or more of Examples 16-20 optionally include wherein the biasing device includes a damper, and the valve housing further comprises a damper receiver configured to house the damper therein, the damper receiver comprising a plurality of slots extending from an outer surface of the receiver to an inner surface of the receiver to reduce heat transfer to the damper.

In Example 22, the subject matter of any one or more of Examples 16-21 optionally include wherein the biasing device includes a spring.

In Example 23, the subject matter of any one or more of Examples 16-22 optionally include wherein the biasing device includes a servo motor.

In Example 24, the subject matter of Example 23 optionally includes wherein the servo motor is controlled based upon exhaust pressure or engine RPM.

In Example 25, the subject matter of any one or more of Examples 16-24 optionally include wherein the valve assembly is configured to control an inlet pressure to a turbine of the gas combustion system.

Example 26 is an internal combustion engine comprising: a gas combustion system; an exhaust pipe; and a valve assembly for controlling an inlet pressure to a turbine of the gas combustion system, the valve assembly comprising: a valve housing coupled to the exhaust pipe; a flapper pivotably coupled to the valve housing to pivot between a full open position and a restricted position in response to exhaust pressure; and a biasing device coupled to the housing and extending into the exhaust pipe to engage the flapper, the biasing device configured to bias the flapper to the restricted position.

In Example 27, the subject matter of Example 26 optionally includes wherein the flapper includes a knuckle and wherein the exhaust pipe includes a hinge port configured to receive the knuckle therethrough when the flapper is secured to the exhaust pipe.

In Example 28, the subject matter of Example 27 optionally includes wherein the housing includes a knuckle recess configured to receive the knuckle therein when the knuckle extends through the hinge port.

In Example 29, the subject matter of any one or more of Examples 27-28 optionally include wherein the housing includes a hinge pin bore intersecting the knuckle recess, the hinge pin bore configured to receive a hinge pin therethrough to secure the knuckle to the housing.

In Example 30, the subject matter of any one or more of Examples 26-29 optionally include a pressure sensor coupled to one of the exhaust pipe or the housing and configured to produce a pressure signal based on the exhaust pressure within the exhaust pipe; and a controller in communication with the pressure sensor and the biasing device, the controller configured to: receive the pressure signal from the pressure sensor; and operate the biasing device to move the flapper between the full open position and the restricted position based on the pressure signal.

In Example 31, the subject matter of Example 30 optionally includes wherein the controller is configured to operate the biasing device to move the flapper toward the full open position as the exhaust pressure increases and move the flapper toward the restricted position as the exhaust pressure decreases.

In Example 32, the subject matter of Example 31 optionally includes wherein the biasing device includes a servo motor.

Example 33 is a snowmobile comprising: a drive system; a steering system; an internal combustion engine coupled to the drive system, the internal combustion engine comprising: a gas combustion system; an exhaust pipe; and a valve assembly configured to passively control an inlet pressure to a turbine of the gas combustion system to restrict the exhaust system to provide low-end torque and to open the exhaust system in response to exhaust system pressure to enhance top end horsepower.

Example 34 is a valve assembly kit configured couple to an exhaust system of a gas combustion system to restrict the exhaust system to provide low-end torque, and to open the exhaust system in response to exhaust system pressure to enhance top end horsepower.

In Example 35, the subject matter of Example 34 optionally includes wherein the valve assembly is configured to control an inlet pressure to a turbine of the gas combustion system.

In Example 36, the subject matter of any one or more of Examples 34-35 optionally include wherein the valve assembly kit includes a flapper contoured to match an inside of the exhaust pipe and a biasing device configured to bias the flapper to a restricted position, the biasing device configured to retract allow movement of the flapper to an open position in response to pressure in the exhaust system.

Example 37 is an internal combustion engine comprising: a gas combustion system; an exhaust pipe; and a valve assembly for controlling an inlet pressure to a turbine of the gas combustion system, the valve assembly comprising: a valve housing coupled to the exhaust pipe; a flapper pivotably coupled to the valve housing to pivot between a full open position and a restricted position in response to exhaust pressure; and a biasing device coupled to the housing and extending into the exhaust pipe to engage the flapper, the biasing device configured to bias the flapper to the restricted position and to resist movement of the flapper between the restricted position and the full open position.

In Example 38, the apparatuses, systems, or method of any one or any combination of Examples 1-37 can optionally be configured such that all elements or options recited are available to use or select from.

This summary is intended to provide an overview of subject matter of the present patent application. It is not intended to provide an exclusive or exhaustive explanation of the disclosure. The detailed description is included to provide further information about the present patent application. Other aspects of the disclosure will be apparent to persons skilled in the art upon reading and understanding the following detailed description and viewing the drawings that form a part thereof, each of which are not to be taken in a limiting sense.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

The present inventors have recognized, among other things, that a combustion engine, e.g., on a snowmobile, may include a variable valve on an exhaust pipe that can be manipulated to improve engine performance. For example, the valve may be configured to open or close in response to exhaust pressure to provide exhaust pressure and flow characteristics that improve the performance of the engine by improving both low-end torque and vehicle acceleration and top-end horsepower and vehicle speed. The variable valve may be particularly effective on race vehicles such as snowmobiles, motorcycles, rally cars, and all-terrain-vehicles (ATVs).

Figure 1A:
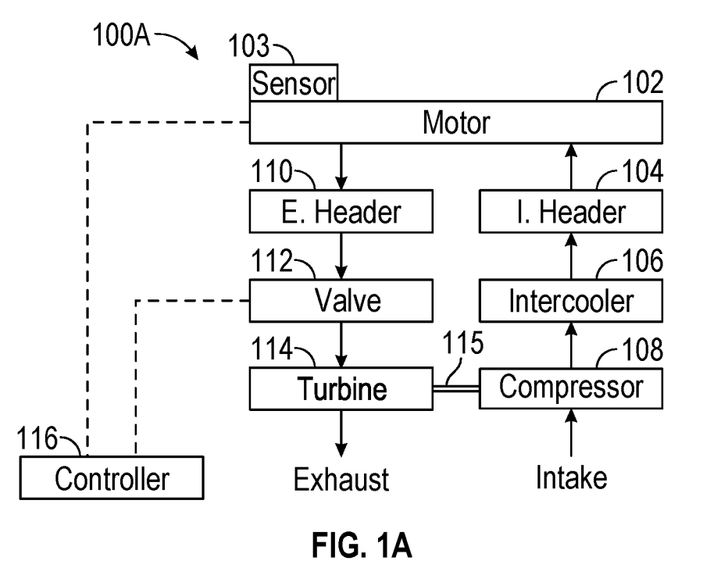
FIG. 1A illustrates a schematic view of a combustion system, in accordance with one example of the present disclosure.

FIG. 1A illustrates a schematic view of combustion system 100, in accordance with one example of the present disclosure. Combustion system 100A can include motor 102, intake header 104, intercooler 106, compressor 108, exhaust header 110, valve 112, turbine 114, and controller 116.

Motor 102 can be a two stroke or four stroke motor that uses a fuel for piston-cylinder combustion. Motor 102 can include 1, 2, 3, 4, 5, 6, 8, 10 cylinders, or the like. Intake header 104 can be configured to distribute intake air to each cylinder. Intercooler 106 can use ambient air (or cooled water or coolant in other examples) to cool high pressure intake air. Compressor 108 and turbine 114 can together form, for example, a turbo charger coupled by shaft 115 where turbine 114 drives compressor 108 to intake and pressurize intake combustion air. Exhaust header 110 can be a manifold or series of pipes configured to receive exhaust combustion gasses from individual cylinders for combination into a single exhaust pipe.

Controller 116 can be electrically connected via wire (or electromagnetically connected via wireless signal) to one or more of valve 112 and motor 102. In some examples, controller 116 can be connected to other sensors within system 100A, such as exhaust pressure and temperatures sensors (not shown in FIG. 1A). Controller 116 can be any computing device, such as a computer, for example, but can be a PLC, smart phone, a tablet, a laptop, a desktop computer, or any other computing device including information processing and storage capabilities and communication capabilities. Controller 116 can include a processor, volatile memory, and static memory, which can be connected by wire or other electrical conduit within local controller 116 and can be configured to receive information, process information, output information, and store information. The information can be temporarily stored on volatile memory and can be relatively permanently stored on static memory. In some examples, configurations of these components within controller 116 can be considered machine readable medium.

The terms "machine readable medium" may include any medium that is capable of storing, encoding, or carrying instructions for execution by the device and that cause the device to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

In operation of some examples, motor 102 can operate as a combustion engine to deliver rotational energy to a drive shaft to drive a transmission. In some examples, the drive shaft can be configured to deliver power to a snowmobile track to motivate a snowmobile. Motor 102 can receive intake air that can be pressurized by compressor 108 and cooled by intercooler 106 to increase power and torque output and/or efficiency of motor 102. Motor 102 can produce exhaust gas that can be delivered to valve 112 upstream of turbine 114.

Valve 112 can be configured to allow the exhaust gas to pass by valve 112 at low pressure (and low flow conditions) without moving valve 112, effectively maintaining a flow cross-section that is smaller than the exhaust pipe to increase a pressure of the exhaust flow delivered to turbine 114. This can help to spool (or spin) turbine 114 faster at lower engine RPMs (and at lower exhaust flows) to help increase torque and horsepower outputs, increasing acceleration and speed of a vehicle utilizing system 100A at relatively low engine RPMs.

As exhaust flow and pressure rise, a flapper (or flow control device) of valve 112 can be forced open by the exhaust pressure to effectively increase the area of the exhaust pipe, reducing pressure drop therethrough. This can allow for an increase in horsepower at relatively high engine RPMs (and high exhaust flow rates) allowing for higher horsepower production from system 100A, resulting in greater top speeds and/or increased efficiency.

In some examples, valve 112 can be a mechanical device, such as a damper, spring, or the like, configured to control operation of the flapper of valve 112. This can use useful in applications where electronic control 112 of valve 112 is not permitted (government or racing restrictions) or when electronic control is not feasible or cost-effective (a small system or an economy-class vehicle).

In some examples, controller 116 can control the operation of valve 112 based on pressures and/or temperatures of system 100A. In some of these examples, valve 112 can include a motor, such as a servo motor, configured to open and close valve 112 between the full open position and the closed position. In one example, controller 116 can open and close valve 112 in response to a pressure signal received from an exhaust pressure sensor of motor 102. For example, controller 116 can command valve 112 to move to a restricted position as the exhaust flow decreases (or when the exhaust flow is low). Controller 116 can also command valve 112 to move toward a full open position as the exhaust flow decreases.

In other examples, controller 116 can operate valve 112 in response to other conditions of system 100A, such as one or more of throttle position, intake and/or exhaust temperatures, intake and/or exhaust flow rate, intake and/or exhaust pressure, or combinations thereof.

Figure 1B:
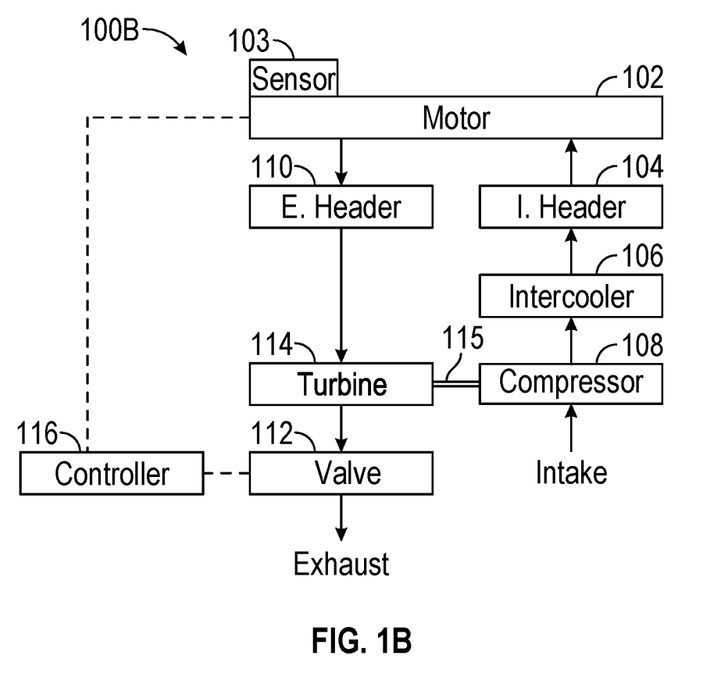
FIG. 1B illustrates a schematic view of a combustion system, in accordance with one example of the present disclosure.

FIG. 1B illustrates a schematic view of combustion system 100B, in accordance with one example of the present disclosure. Combustion system 100B can be similar to combustion system 100A except that valve 112 can be downstream of turbine 114. In this arrangement, valve 112 will affect only the exhaust flow downstream of turbine 114, which can reduce disruption (turbulence) of flow into turbine 114. In some examples, an exhaust side of system 100B can include a muffler downstream or upstream of valve 112.

Figure 2:
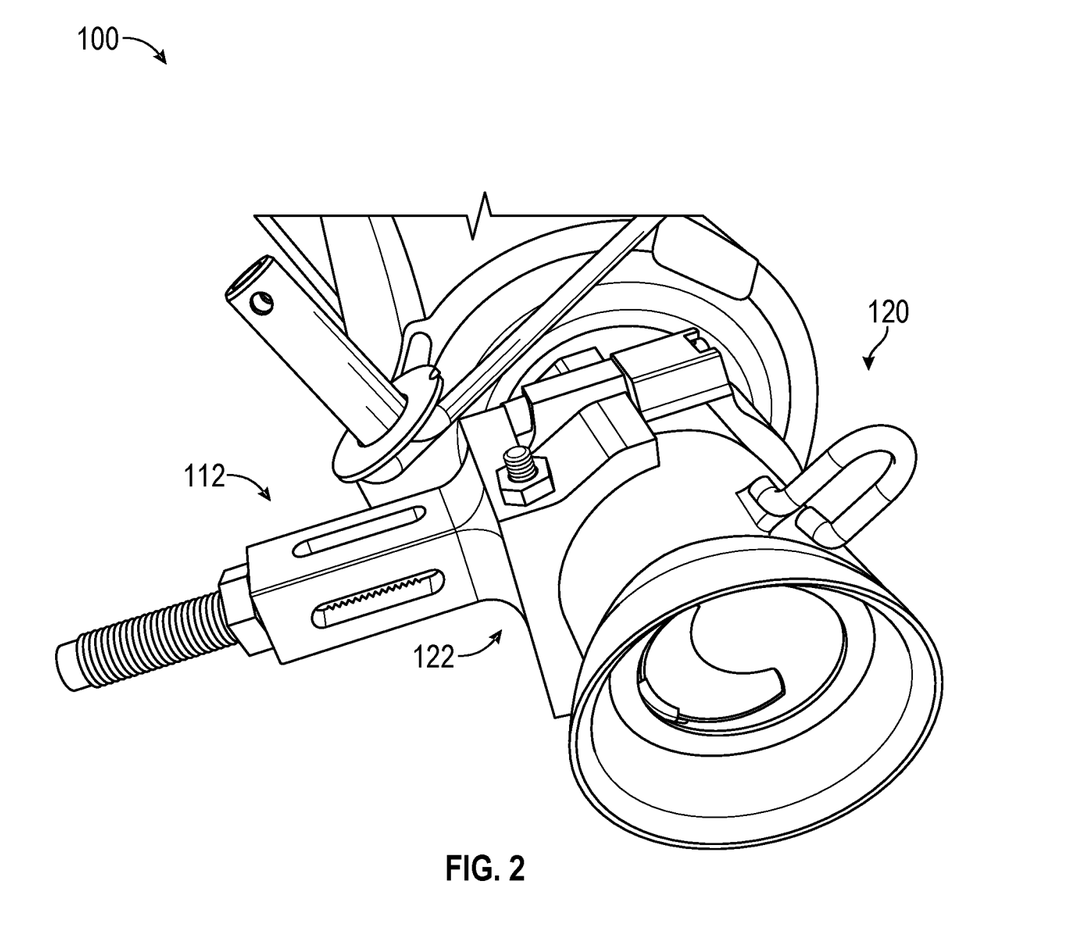
FIG. 2 illustrates a perspective view of a valve system secured to an exhaust pipe, in accordance with one example of the present disclosure.

FIG. 2 illustrates a perspective view of valve system 100 secured to exhaust pipe 120, in accordance with one example of the present disclosure. FIG. 2 shows how housing 122 of valve system 100 can be secured to an external portion of exhaust pipe 120 for operation as discussed above with respect to FIG. 1 and as discussed below with respect to at least FIGS. 3A-4B.

Figure 3A:
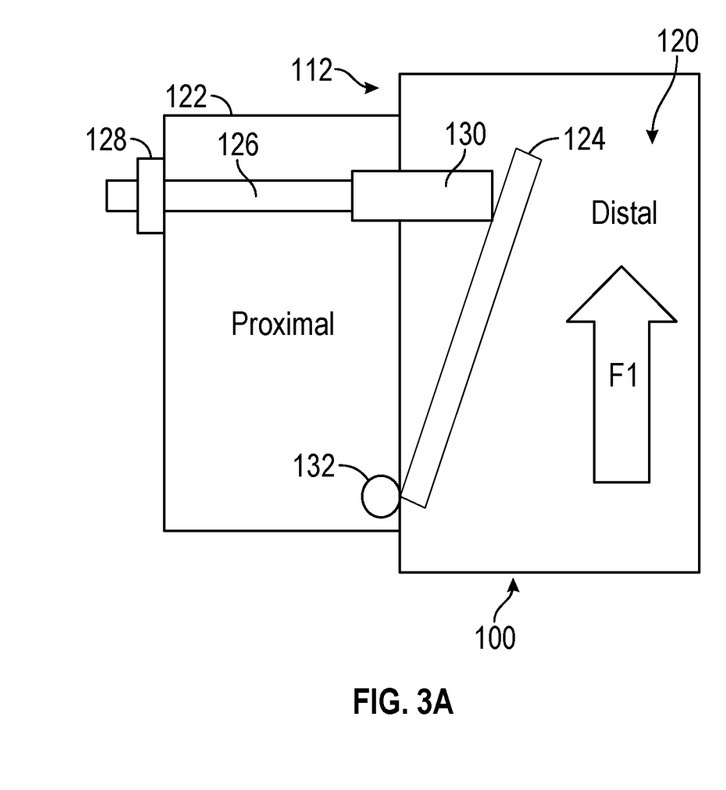
FIG. 3A illustrates a schematic view of a valve system in a first position, in accordance with one example of the present disclosure.
Figure 3B:
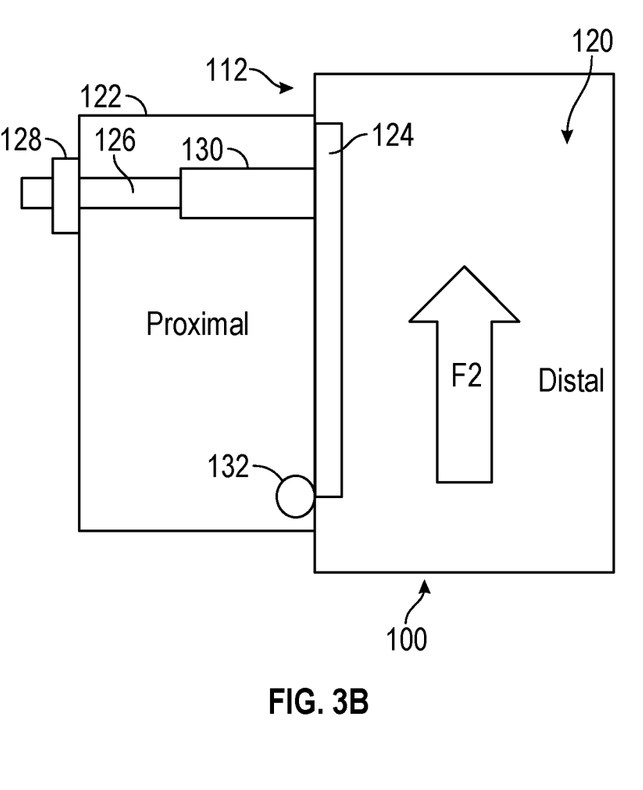
FIG. 3B illustrates a schematic view of a valve system in a second position, in accordance with one example of the present disclosure.

FIG. 3A illustrates a schematic view of valve system 100 in a first position, in accordance with one example of the present disclosure. FIG. 3B illustrates a schematic view of valve system 100 in a second position, in accordance with one example of the present disclosure. FIGS. 3A and 3B are discussed below concurrently.

System 100 can include valve 112 and exhaust pipe 120. Valve 112 can include housing 122, flapper 124, biasing device 126 (or damper 126), nut 128, plunger 130, and hinge 132. Also shown in FIG. 3A is flow F1 and also shown in FIG. 3B is flow F2.

Housing 122 can be a valve housing comprised of rigid or semi-rigid materials such as aluminum, steel, combinations thereof, or the like. Flapper 124 can be a rigid or semi-rigid member configured to be disposed within exhaust pipe 120. Flapper 124 can be comprised of materials resistant to high pressures and heat, such as steel, titanium, alloys thereof, or the like. Flapper 124 can be pivotably coupled to housing 122 at hinge 132. In other examples, flapper 124 can be pivotably coupled to exhaust pipe 120 or another components of system 100.

Biasing device 126 can be a damper such as a shock, spring, or other device configured to bias flapper 124 into exhaust pipe 120. Nut 128 can be a jamb nut, for example, securable to damper 126 and housing 122 and configured to limit movement of biasing device 126 relative to housing 122 and exhaust pipe 120. Plunger 130 can be translatably engaged with biasing device 126 and can be extendable into exhaust pipe to engage flapper 124.

In operation of some examples, flapper 124 can restrict flow F1 (as shown in FIG. 3A) through exhaust pipe 120, increasing a pressure within the exhaust pipe, which can increase the pressure delivered, such as to a turbine of a compressor. The increased pressure at relatively low flows can allow the turbine to spool (or spin) relatively faster, which can spin the compressor faster, providing additional combustion air for increased torque and/or horsepower at relatively low engine RPMs. Operation of flapper 124 can therefore increase throttle responsiveness at low engine RPMs.

As the flow increases to flow F2 (shown in FIG. 3B), the increased pressure of the exhaust can apply a pressure on a distal side of flapper 124 that forces plunger 130 proximally, and forces biasing device 126 to retract (proximally), allowing flapper 124 to move proximally toward the proximal wall of exhaust pipe 120. Flapper 124 can conform to (or be sized and shaped to match) the wall of the exhaust pipe 120, which can increase the effective diameter of exhaust pipe 120 (as discussed below), reducing a pressure drop through the exhaust pipe and reducing back pressure to the motor. This can increase the horsepower produced by the motor at relative high engine RPMs, increasing maximum horsepower significantly, in some examples.

When the RPMs of the engine fall, exhaust flow may be decreased, for example, back to flow F1. In this case, biasing device 126 can overcome the pressure of the exhaust stream and can force plunger 130 and therefore flapper 124 distally to decrease the effective diameter of exhaust pipe 120 and again increase flow pressure.

In some examples, biasing device can be an adjustable dampener configured to provide an adjustable force to plunger 130. This can allow a user to adjust the response of biasing device 126 to exhaust pressure to "dial-in" valve 112 for desired performance conditions. This can also allow a single design of valve 112 to be used with multiple systems having different performance characteristics, such as different power (horsepower) and torque curves.

Though flapper 124 is shown only in a restricted position (FIG. 3A) and a full open position (FIG. 3B), flapper 124 can move to any position between the restricted position and the full open position in response to the pressure of the exhaust stream.

Figure 3C:
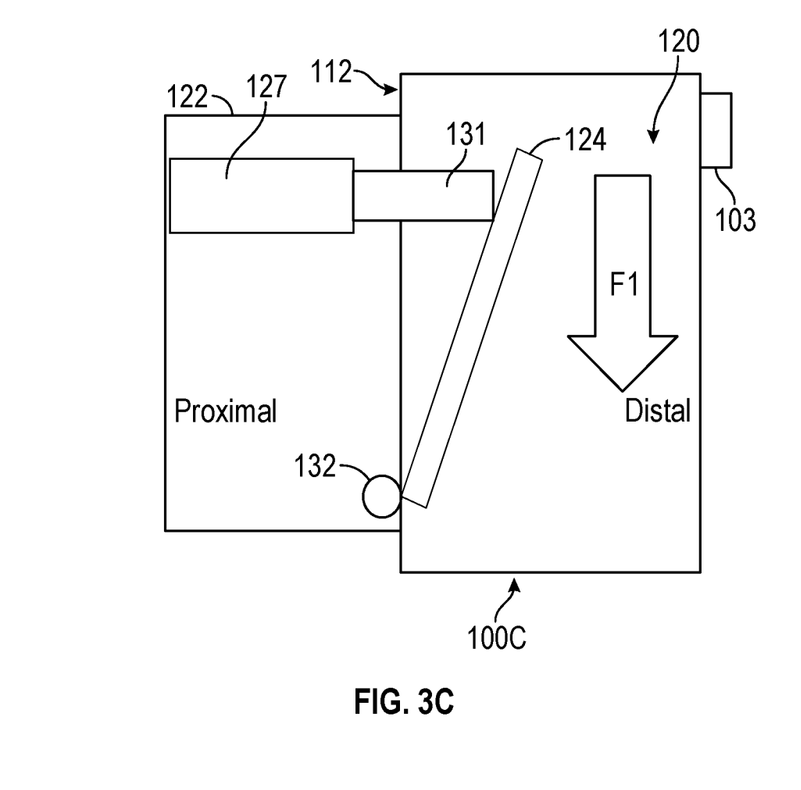
FIG. 3C illustrates a schematic view of a valve system in a first position, in accordance with one example of the present disclosure.
Figure 3D:
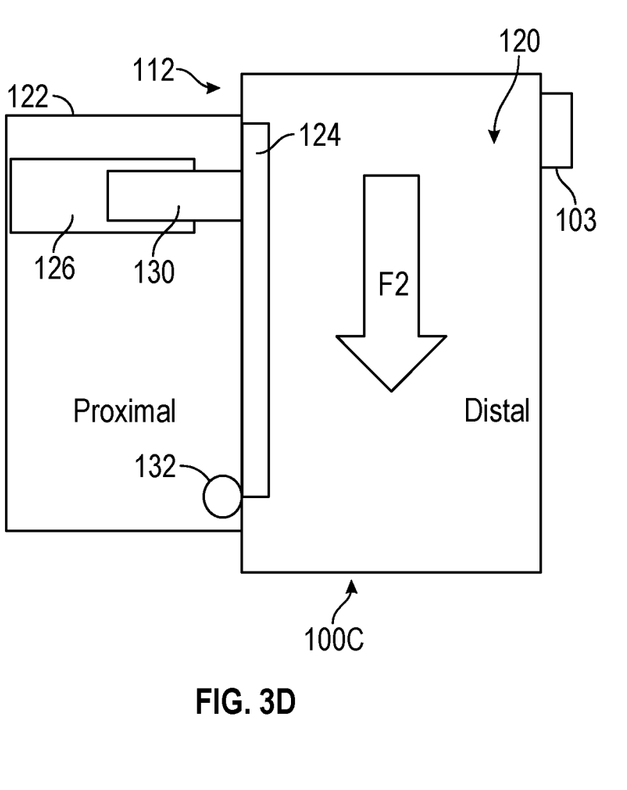
FIG. 3D illustrates a schematic view of a valve system in a second position, in accordance with one example of the present disclosure.

FIG. 3C illustrates a schematic view of valve system 100C in a first position, in accordance with one example of the present disclosure. FIG. 3D illustrates a schematic view of valve system 100C in a second position, in accordance with one example of the present disclosure. FIGS. 3C and 3D are discussed below concurrently. The valve system 100C can include a pressure sensor, controller, and actuator. The controller can operate the actuator to move the flapper in response to exhaust pressure. In some examples, the flapper can open against pressure. Any of the previous or following valve systems can includes the features discussed with respect to FIGS. 3C and 3D The valve system 100C of FIGS. 3C and 3D can be similar to those of FIGS. 3A and 3B, except flow F1 and flow F2 can flow in an opposite direction relative to flows of FIGS. 3A and 3B, such that flows F1 and F2 are reversed relative to the opening direction of flapper 124. Further, the valve system 100C can differ in that it includes actuator 127 having arm 131.

Actuator 127 can be an actuator device connected to a controller, such as controller 116 of FIGS. 1A and 1B. Actuator 127 can be a linear actuator, such as a solenoid, threaded rod, pneumatic piston and cylinder, hydraulic piston and cylinder, or the like. In some examples, arm 131 of actuator 127 can be controlled by a controller based on a detected flow.

Valve system 100C can also differ in that it can include sensor 103, which can be in communication with a controller, such as controller 116 of FIGS. 1A and 1B. Sensor 103 can be a flow or pressure sensor. In an example where sensor 103 is a pressure sensor, sensor 103 can be a differential pressure sensor, configured to produce a pressure signal based on a pressure of flow F1 and flow F2.

As discussed above with respect to FIGS. 3A and 3B, when the flow increases to flow F2 (shown in FIG. 3D), the increased pressure of the exhaust can apply a pressure on flapper 124. However, in the arrangement of FIGS. 3C and 3D, the flow can contact a proximal side of flapper 124 as it flows through exhaust pipe 120. Force generated by the contact between the flow (for example flow F1) and the proximal side of flapper 124 can pin (or hold) flapper 124 in an open position, helping to prevent flapper 124 from moving proximally.

When the sensor 103 detects the higher pressure (indicative of a higher flow), the controller can send a signal to actuator 127 to drive arm 131 to retract (proximally) to move flapper 124 proximally (as shown in FIG. 3D). This can increase the size of the exhaust pipe 120 to reduce pressure therethrough, allowing for relatively higher torque and power output from an upstream turbocharger and/or motor.

When the RPMs of the engine fall, exhaust flow may be decrease, for example, back to flow F1. In this case, the controller can detect a drop in the exhaust pressure through sensor 103 and can operate actuator 127 to extend arm 131 (as shown in FIG. 3C) to move flapper 124 distally to decrease the diameter of exhaust pipe 120 to again increase flow pressure.

Figure 4A:
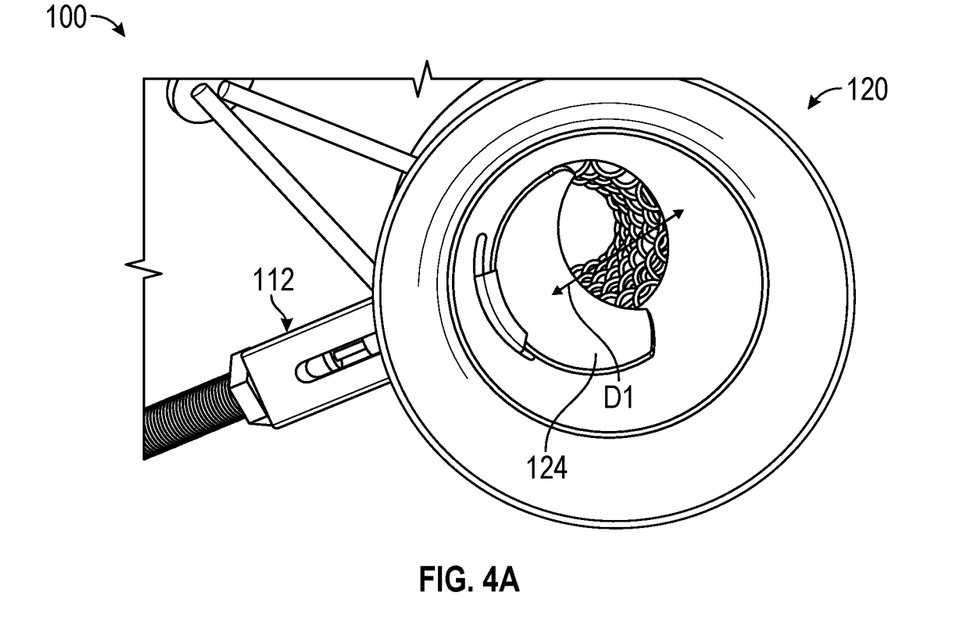
FIG. 4A illustrates a schematic view of a valve system in a first position, in accordance with one example of the present disclosure.
Figure 4B:
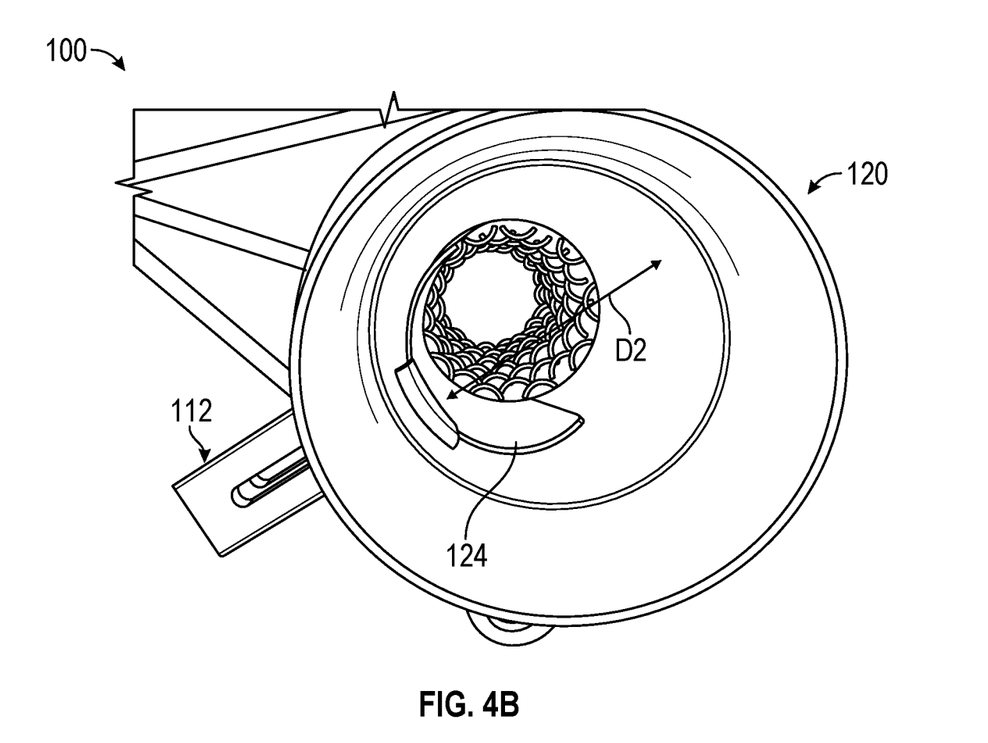
FIG. 4B illustrates a schematic view of a valve system in a second position, in accordance with one example of the present disclosure.

FIG. 4A illustrates a schematic view of valve system 100 in a restricted position, in accordance with one example of the present disclosure. FIG. 4B illustrates a schematic view of valve system 100 in a full open position, in accordance with one example of the present disclosure. FIGS. 4A and 4B are discussed below concurrently.

FIG. 4A illustrates how flapper 124 can be in a restricted flow position to create diameter D1 of pipe 120 for relatively low flow conditions to increase pressure through exhaust pipe 120. FIG. 4B illustrates how flapper 124 can be in a full open position to create diameter D2 (larger than diameter D1) of exhaust pipe 120 to reduce pressure drop through exhaust pipe 120. FIG. 4B also illustrates how flapper 124 can have a geometric shape that is complementary to exhaust pipe 120 such that flapper 124 can reduce or minimize flow restriction caused by flapper 124 when flapper 124 is in a full open position (as shown in FIG. 4B) to help reduce pressure drop over flapper 124 when flapper 124 is in the full open position. In some examples, exhaust pipe 120 can include a recess to receive flapper 124 therein to further increase diameter D2 and further reduce pressure drop caused by flapper 124 when flapper 124 is in the open position.

Figure 5:
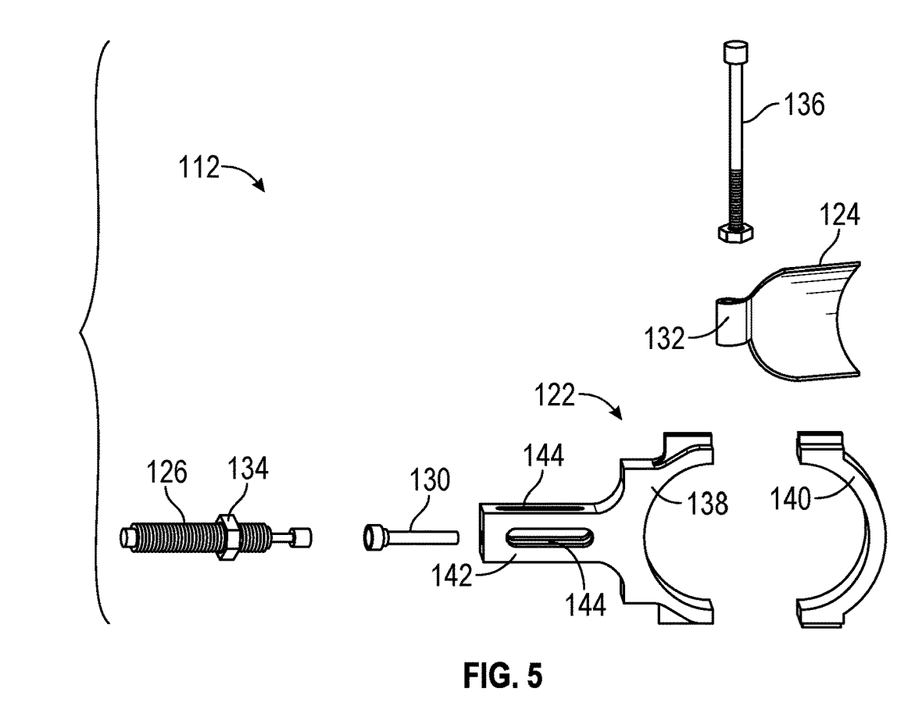
FIG. 5 illustrates an exploded perspective view of a valve system, in accordance with one example of the present disclosure.

FIG. 5 illustrates an exploded perspective view of valve 112, in accordance with one example of the present disclosure. Valve 112 can include housing 122, biasing device 126, plunger 130, hinge 132, jamb nut 134, and hinge pin 136. The housing 122 can include first portion 138 and second portion 140, where first portion 138 can include receiver 142.

In some examples, plunger 130 can be introduced into housing 122 through receiver 142 and biasing device 126 can be threadably secured to receiver 142 to engage plunger 130. Jamb nut 134 can be threadably secured to biasing device 126 to prevent back-out of biasing device 126 from receiver 142 and therefore from housing 122. Biasing device 126 can be threaded into receiver 142 at a desired distance to achieve a desired default position of flapper 124 with respect to the exhaust pipe.

Hinge pin 136 can be passed through first portion 138 of housing 122 and through hinge 132 (or knuckle 132) of flapper 124 to secure flapper 124 to housing 122. Hinge pin 136 can be threadably secured to housing 122, in some examples.

During operation of valve 112, components thereof can become hot from heat transferred from the exhaust flow through exhaust pipe 120. As shown in FIG. 5, receiver 142 can include slots 144 to promote cooling of plunger 130 and biasing device 126. Because plunger 130 is a separate piece from biasing device 126, plunger 130 can help reduce heat transfer from an exhaust pipe to biasing device 126 to help reduce thermal cycling and therefore stress on biasing device 126, which can help increase component life of biasing device 126.

Figure 6:
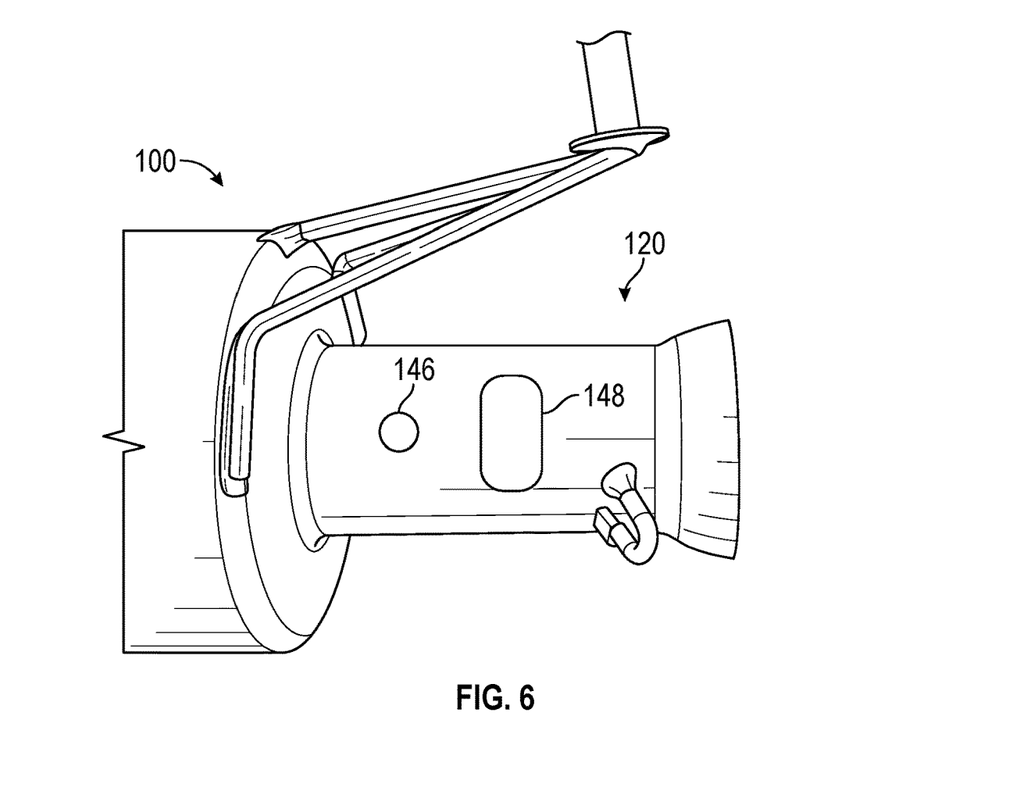
FIG. 6 illustrates a perspective view of a portion of a valve system, in accordance with one example of the present disclosure.

FIG. 6 illustrates a perspective view of a portion of valve system 100, in accordance with one example of the present disclosure. FIG. 6 illustrates exhaust pipe 120 with valve 112 removed to show plunger port 146 and hinge port 148.

Plunger port 146 can extend through the wall of exhaust pipe 120 and can be sized and configured to receive plunger 130 therethrough. Similarly, hinge port 148 can extend through the wall of exhaust pipe 120 and can be sized and configured to receive hinge 132 (or knuckle 132) therethrough. In some examples, plunger port 146 can be substantially round and hinge port 148 can have a shape that is substantially rectangular with rounded corners. However, plunger port 146 and hinge port 148 can have other shapes in other examples.

Figure 7:
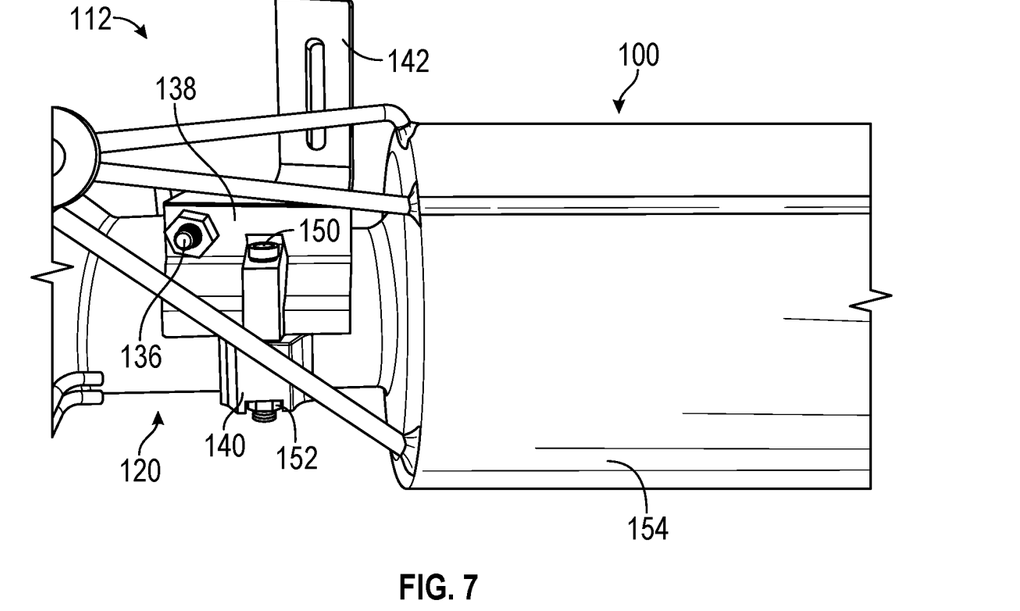
FIG. 7 illustrates a perspective view of a portion of a valve system, in accordance with one example of the present disclosure.
Figure 8:
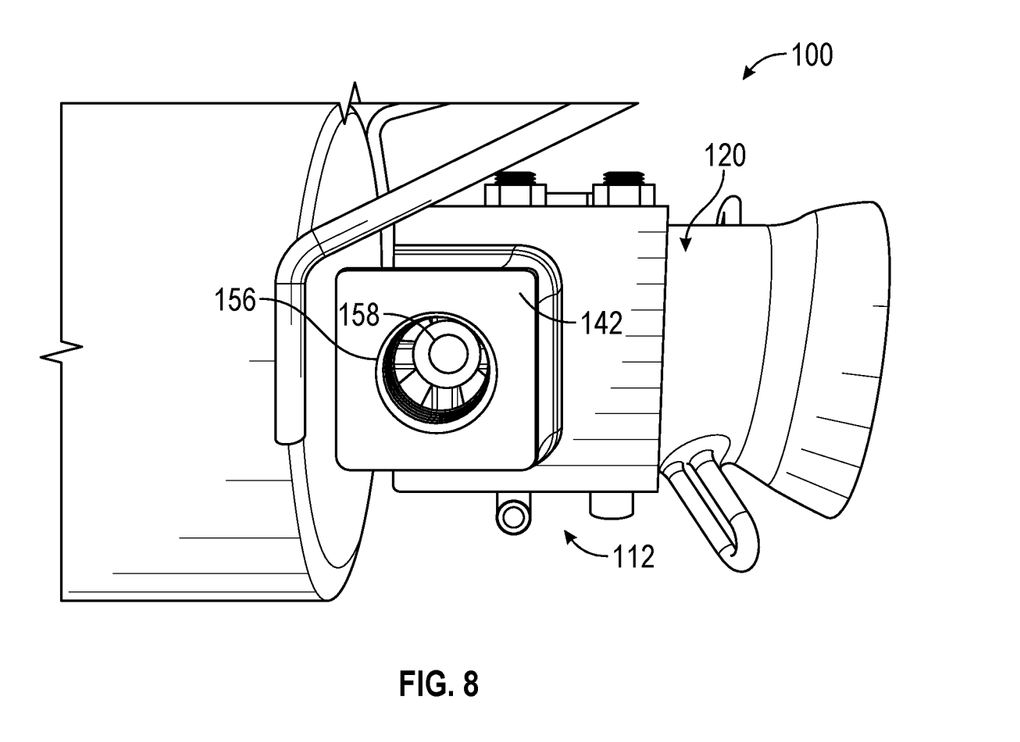
FIG. 8 illustrates a perspective view of a portion of a valve system, in accordance with one example of the present disclosure.
Figure 9:
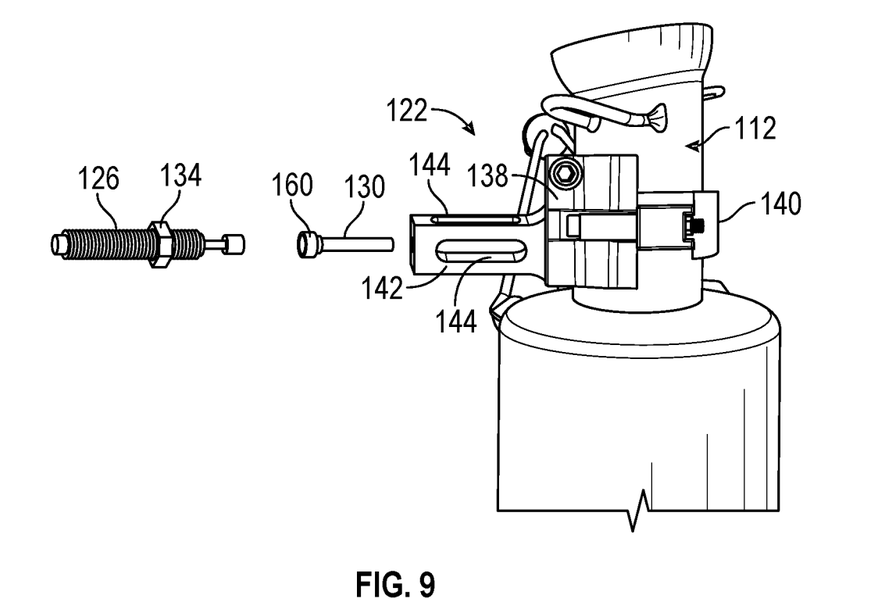
FIG. 9 illustrates a partially exploded perspective view of a portion of a valve system, in accordance with one example of the present disclosure.

FIG. 7 illustrates a perspective view of a portion of valve system 100, in accordance with one example of the present disclosure. FIG. 8 illustrates a perspective view of a portion of valve system 100, in accordance with one example of the present disclosure. FIG. 9 illustrates a partially exploded perspective view of a portion of a valve system 100, in accordance with one example of the present disclosure. FIGS. 7-9 are discussed below concurrently.

The components of valve system 100 can be consistent with those discussed above with respect to FIGS. 1-6; FIGS. 7-9 show additional details of valve system 100. For example, FIG. 7 shows how hinge pin 136 can extend through first portion 138 to secure flapper 124 to first portion 138. In some examples, hinge pin 136 can be threaded to receive a nut to secure hinge pin 136 to first portion 138 of housing 122.

FIG. 7 also shows housing bolt 150 and nut 152. In some examples, housing bolt 150 can extend through first portion 138 and second portion 140 and can receive nut 152 to secure housing bolt 150 to first portion 138 and second portion 140. FIG. 7 further shows muffler 152, which can be connected to exhaust pipe 120 either upstream or downstream of valve 112.

FIG. 8 shows that receiver 142 can include central bore 156, which can extend through receiver 142 and can be substantially aligned (and/or coaxial with) housing port 158. Housing port 158 can extend through housing 122 and can be aligned with plunger port 146 of exhaust pipe 120.

Central bore 156 can be sized and shaped to receive plunger 130 and biasing device 126 therein. In some examples, central bore 156 can be sized to have a slightly larger diameter than a diameter of head 160 of plunger 130 to help limit non-axial movement of plunger 130 with respect to receiver 142.

FIG. 9 illustrates how housing 122 can be secured to exhaust pipe 120 and that plunger 130 can be inserted to receiver 142. Biasing device 126 can be threadably inserted into receiver 142 to engage plunger 130.

Figure 10:
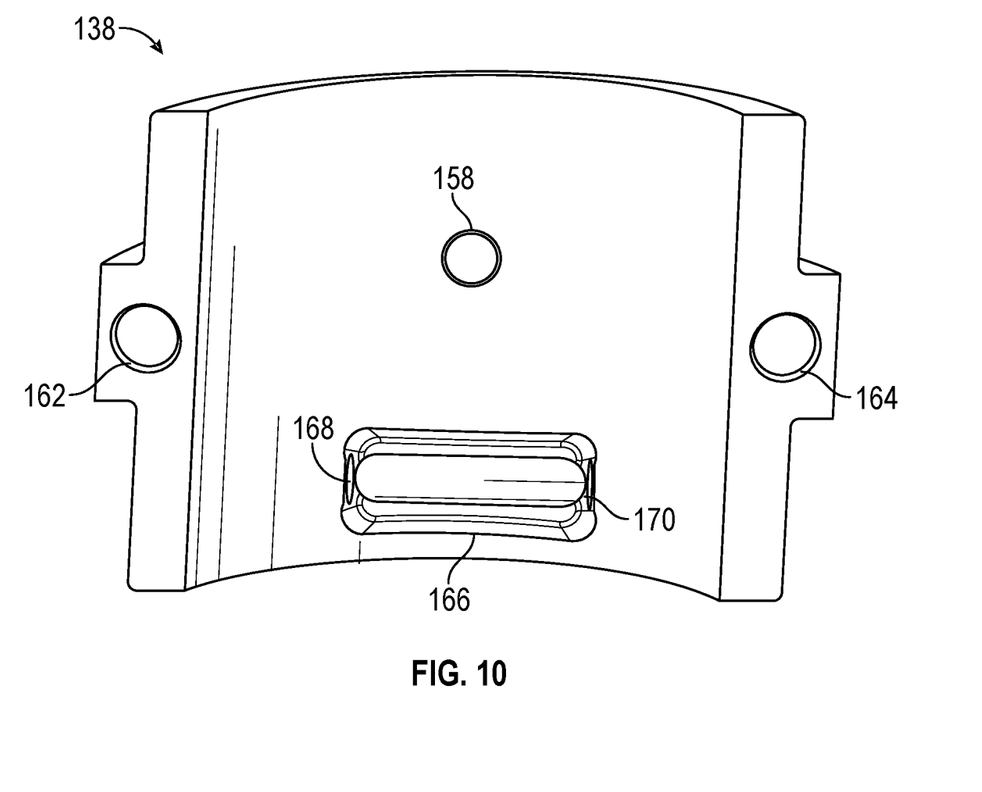
FIG. 10 illustrates a perspective view of a portion of a valve system, in accordance with one example of the present disclosure.

FIG. 10 illustrates a perspective view of a portion of a valve system, in accordance with one example of the present disclosure. FIG. 10 shows mounting bores 162 and 164, which can be configured to receive fasteners therethrough to secure first portion 138 of housing 122 to second portion 140 and also to exhaust pipe 120. FIG. 10 also shows plunger bore 158 that can be alignable with the plunger port 146 of exhaust pipe 120.

FIG. 10 further shows knuckle recess 166 that can be alignable with hinge port 148 of FIG. 6. Knuckle recess 166 can receive knuckle 132 of flapper 124 therein and can allow rotation of knuckle 132 within knuckle recess 146. Knuckle recess 166 can include hinge pin bores 168 and 170, which can extend through first portion 138 of housing 122. Hinge pin bores 168 and 170 can be substantially coaxial and can be configured to receive hinge pin 136 therethrough to allow hinge pin 136 to extend through knuckle 132 to retain knuckle 132 within knuckle recess 166 and to secure flapper 124 to first portion 138.

Figure 11:
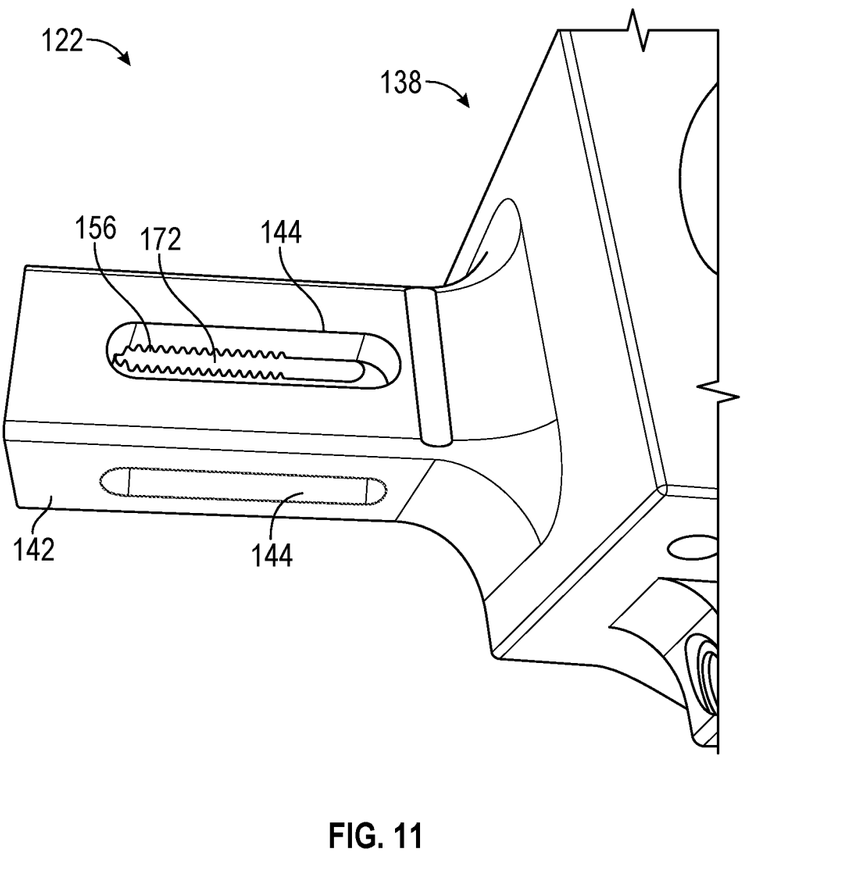
FIG. 11 illustrates a perspective view of a portion of a valve system, in accordance with one example of the present disclosure.

FIG. 11 illustrates a perspective view of a portion of first portion 138 of housing 122 of valve system 100, in accordance with one example of the present disclosure. FIG. 11 illustrates details of receiver 142, such as cooling slots 144. Cooling slots 144 can extend from an outer surface of receiver 142 to an inner surface of receiver 142 and can intersect with central bore 156. Cooling slots 144 can be sized to provide cooling to the biasing element 126 and plunger 130 while still providing structural rigidity required to support biasing device 126 in operation.

FIG. 11 also shows threading 172 of central bore 156 of receiver 142 that is interrupted by cooling slots 144. Threading 172 can provide additional threading for improved coupling of biasing element 126 to receiver 142.

Figure 12A:
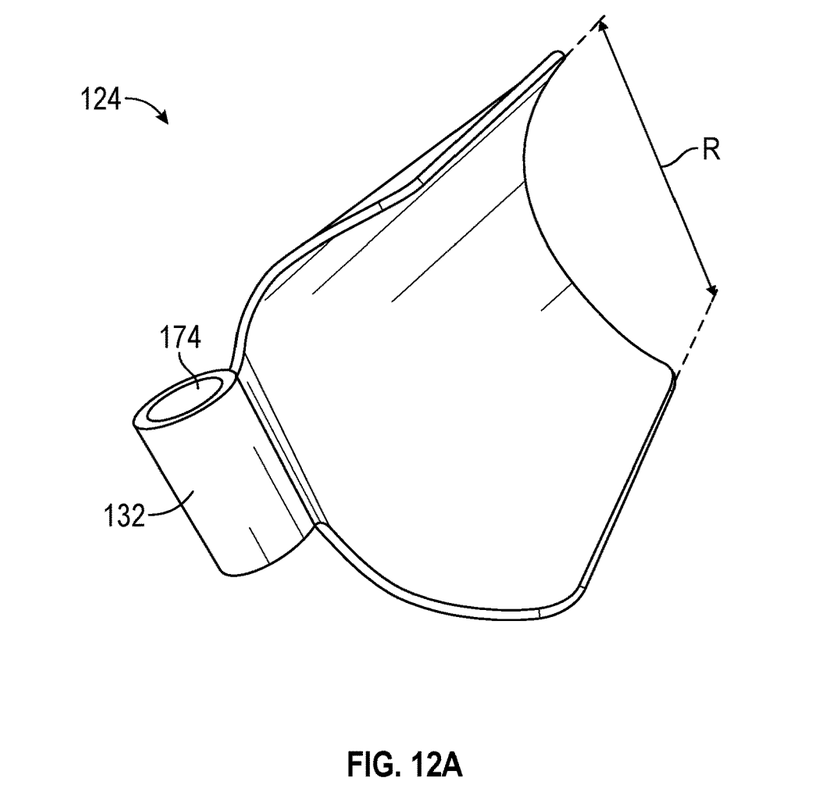
FIG. 12A illustrates a perspective view of a portion of a valve system, in accordance with one example of the present disclosure.
Figure 12B:
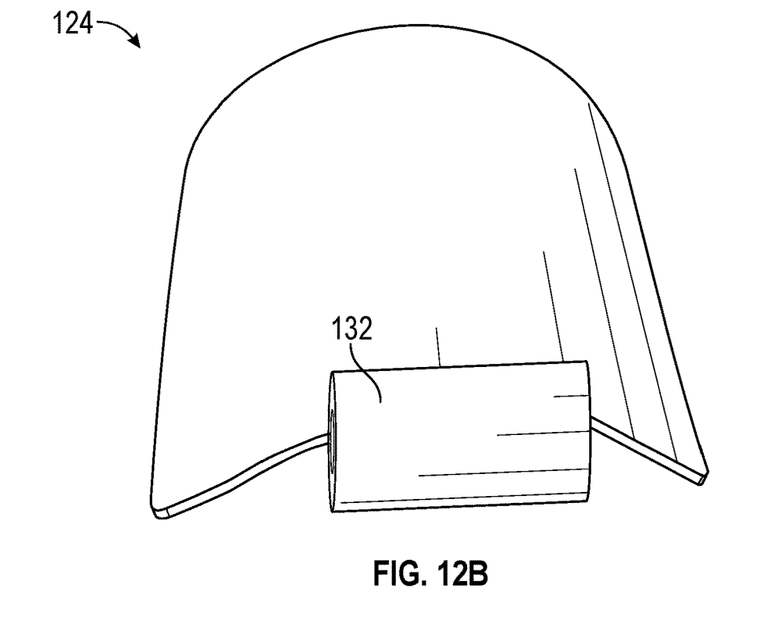
FIG. 12B illustrates a perspective view of a portion of a valve system, in accordance with one example of the present disclosure.

FIG. 12A illustrates a perspective view of flapper 124 of valve system 100, in accordance with one example of the present disclosure. FIG. 12B illustrates a perspective view of flapper 124 of valve system 100, in accordance with one example of the present disclosure.

FIGS. 12A and 12B show a hinge knuckle of flapper 124. FIG. 12A also shows how flapper 124 can have a radius of curvature R that can be complementary to a curvature of the exhaust pipe. Matching curvature R of flapper 124 to the internal wall of exhaust pipe 120 can help to reduce pressure drop when flapper 124 is in a wide-open position, as discussed above.

FIGS. 12A and 12B also show bore 174 of knuckle 132 of flapper 124. Bore 174 can be sized and shaped to receive hinge pin 136 therethrough co create a hinge about which flapper 124 can rotate within exhaust pipe 120.

The position of valve may be varied to improve engine performance across a range of operating parameters. For example, a larger effective exhaust pipe (e.g., valve open) may provide more top end horsepower. A smaller effective exhaust pipe provide (e.g., valve partially closing exhaust pipe) may provide more bottom end torque and more acceleration by raising the pressure in the exhaust system.

A valve may include a flapper-type valve on the inside of an exhaust pipe. The valve may be shaped (e.g., contoured) to avoid binding on the inside of the exhaust pipe and to reduce pressure drop. The valve may be coupled to a control mechanism (e.g., pusher) on the outside of the exhaust pipe. For example, a hole may be formed in the exhaust pipe to provide a pathway for mechanical coupling of the valve to a pusher. A housing may be mounted over the hole and exhaust pipe to provide a seal and to house components of the valve system external to the exhaust pipe. The valve, for example, may be pivotably mounted on a pin, and rotated between open and closed positions using a control mechanism (e.g., pusher or plunger), that may be coupled to a shock-absorber, spring, or other biasing mechanism.

The valve may be biased by a pusher (e.g., piston or plunger), which may be biased toward the valve by a bias member. The bias member may be passive (e.g., shock absorber or spring) or active (e.g., servo control.)

In some examples, the valve may be dampened on compression side (e.g., as the valve is opened) so that pressure does not blow it all the way open In some examples, the valve may not be dampened on rebound (i.e., in the closing direction.) In some examples, dampening may be adjusted with a screw on the back of a shock absorber.

In some examples, the pusher may be controlled by a servo motor. The servo motor may be configured to replicate a passive system, e.g., the servo may be responsive to force on the servo from the mechanical coupling, or the servo motor may provide a constant or predefined force profile over a range of motion. In some examples, the servo may be adjusted based on engine RPM or exhaust system pressure.

In some examples, the system may include an RPM sensor or pressure sensor, which may be used as input to the servo motor.

Various system configurations are possible. For example, the valve may be upstream of the muffler. In another configuration, the valve may be downstream of the muffler. In some examples, a supercharger or turbocharger may be downstream of the valve. In some examples, a valve may be provided on each cylinder.

In a system with multiple or split exhaust systems, the system may have a valve on each exhaust system. In servo-controlled systems, the servo may be controlled by a parameter (e.g., pressure) specific to a portion of the system, or the servo motors may be controlled based on a common input (e.g., RPM or an average pressure or common pressure).

In some examples, a system may have multiple exhaust pipes that converge into a single pipe that includes the variable valve. For example, a system may include a triple-Y configuration that converges into a single pipe that includes the variable valve. In various examples, the valve may be used with 2-stroke engine or 4-stroke engine.

Each of these non-limiting examples can stand on its own, or can be combined in various permutations or combinations with one or more of the other examples.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Geometric terms, such as "parallel", "perpendicular", "round", or "square", are not intended to require absolute mathematical precision, unless the context indicates otherwise. Instead, such geometric terms allow for variations due to manufacturing or equivalent functions. For example, if an element is described as "round" or "generally round", a component that is not precisely circular (e.g., one that is slightly oblong or is a many-sided polygon) is still encompassed by this description.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

What is claimed is:

1. A valve assembly for controlling an exhaust pressure of a gas combustion system, the valve assembly comprising:
   a valve housing connected to an exhaust pipe;
   a flapper pivotably connected to the valve housing to pivot between a full open position and a restricted position in response to exhaust pressure; and
   a biasing device including;
      a plunger located within the valve housing and engaged with the flapper;
      a damper receiver including a plurality of slots extending through the damper receiver; and
      a damper secured to the damper receiver and connected to the plunger, the damper configured to contact the damper receiver and the plunger to bias the flapper toward the restricted position and to resist movement of the flapper from the restricted position to the full open position.

2. The valve assembly of claim 1, wherein:
   a distal end of the plunger is extendable into the exhaust pipe to control the flapper.

3. The valve assembly of claim 2, wherein the plunger is separated from the flapper.

4. The valve assembly of claim 1, wherein the flapper comprises a shape complimentary to the exhaust pipe when the flapper is in the full open position.

5. The valve assembly of claim 1, wherein a resistance of the biasing device is adjustable.

6. The valve assembly of claim 5, wherein the biasing device is a spring.

7. The valve assembly of claim 1, wherein the biasing device further includes an actuator.

8. The valve assembly of claim 7, wherein the actuator is connected to a controller and controlled based upon at least one of an exhaust pressure and engine RPM as sensed by a sensor.

9. A valve assembly for controlling an exhaust pressure of a gas combustion system, the valve assembly comprising:
an exhaust pipe including a hinge port;
a valve housing connected to the exhaust pipe;
a flapper located at least partially within the exhaust pipe, the flapper including a knuckle extending through the hinge port to pivotably connect the flapper to the valve housing, the flapper configured to pivot between a full open position and a restricted position in response to exhaust pressure; and
a biasing device comprising:
a plunger located within the valve housing and engaged with the flapper;
a damper receiver connected to the valve housing; and
a damper located at least partially within the damper receiver, the damper engaged with the plunger to bias the flapper toward the restricted position and to resist movement of the flapper from the restricted position to the full open position.

10. The valve assembly of claim 9, wherein the valve housing includes a knuckle recess configured to receive at least a portion of the knuckle therein when the knuckle extends through the hinge port.

11. The valve assembly of claim 10, wherein the valve housing includes a hinge pin bore intersecting the knuckle recess, and a hinge pin extending through the hinge pin bore to secure the knuckle to the housing.

12. An internal combustion engine comprising:
a gas combustion system;
an exhaust pipe; and
a valve assembly for controlling an inlet pressure to a turbine of the gas combustion system,
the valve assembly comprising:
a valve housing coupled to the exhaust pipe;
a flapper pivotably coupled to the valve housing to pivot between a full open position and a restricted position in response to exhaust pressure;
an actuator coupled to the housing and extending into the exhaust pipe to engage the flapper; and
a pressure sensor coupled to one of the exhaust pipe to sense an actual exhaust pressure within the exhaust pipe; and
a controller configured to:
operate the biasing device to actuate the flapper by the actuator between the full open position and the restricted position based on the actual pressure having been sensed.

13. The valve assembly of claim 12, wherein the flapper includes a knuckle and wherein the exhaust pipe includes a hinge port configured to receive the knuckle therethrough when the flapper is secured to the exhaust pipe.

14. The valve assembly of claim 13, wherein the housing includes a knuckle recess configured to receive the knuckle therein when the knuckle extends through the hinge port.

15. The valve assembly of claim 13, wherein the housing includes a hinge pin bore intersecting the knuckle recess, the hinge pin bore configured to receive a hinge pin therethrough to secure the knuckle to the housing.

16. The valve assembly of claim 12, wherein the controller is configured to operate the actuator to move the flapper toward the full open position as the exhaust pressure increases and move the flapper toward the restricted position as the exhaust pressure decreases.

\* \* \* \* \*

UNITED STATES PATENT AND TRADEMARK OFFICE
CERTIFICATE OF CORRECTION

PATENT NO. : 10,883,417 B2
APPLICATION NO. : 16/196833
DATED : January 5, 2021
INVENTOR(S) : Houle et al.

Page 1 of 1

It is certified that error appears in the above-identified patent and that said Letters Patent is hereby corrected as shown below:

In the Claims

In Column 14, Line 54, in Claim 1, delete "including;" and insert --including:-- therefor Signed and Sealed this
Eighth Day of February, 2022

Drew Hirshfeld
*Performing the Functions and Duties of the
Under Secretary of Commerce for Intellectual Property and
Director of the United States Patent and Trademark Office*